Nov. 15, 1927. 1,649,331
C. E. WHITEMAN
MOTION PICTURE CAMERA AND PICTURE PROJECTING MACHINE
Filed May 24, 1922 6 Sheets-Sheet 2
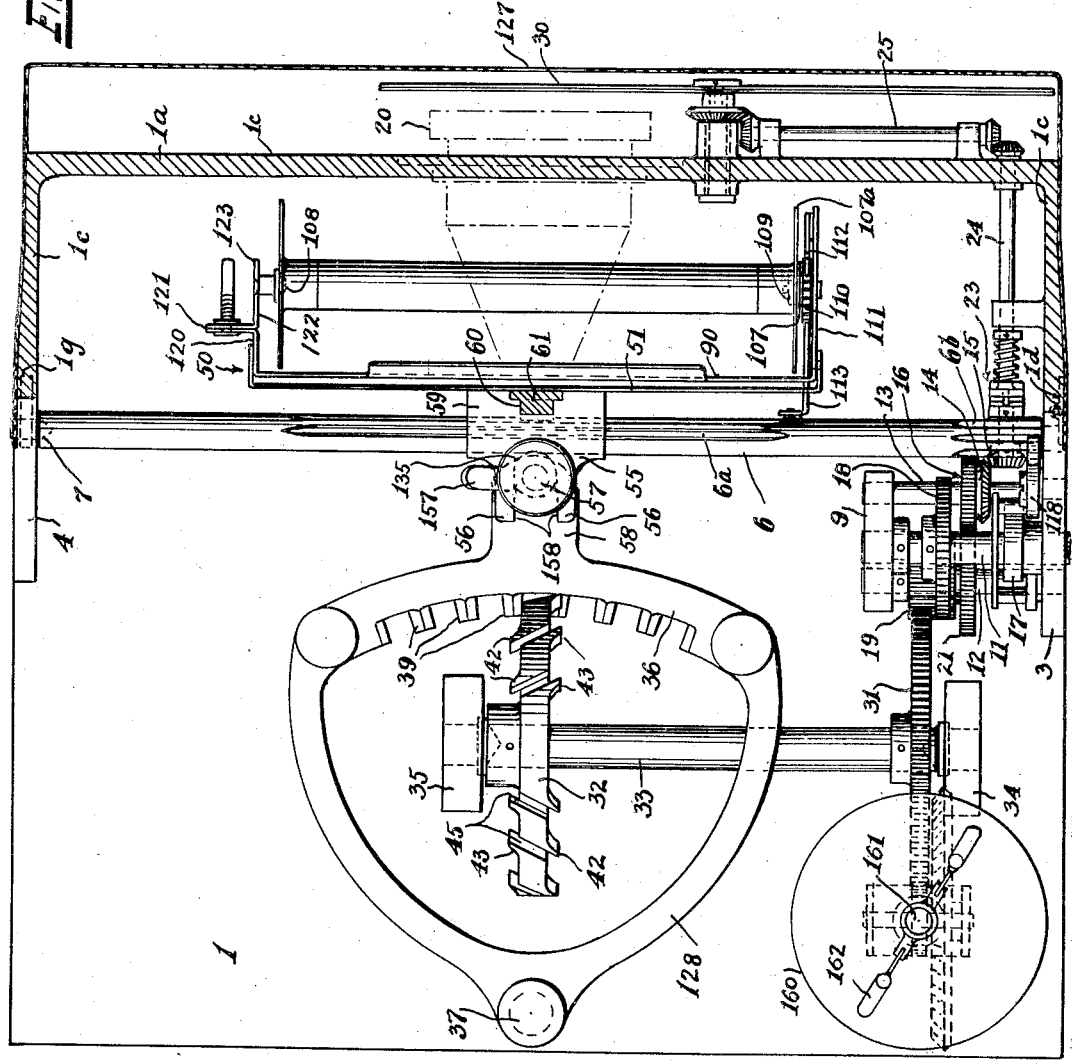

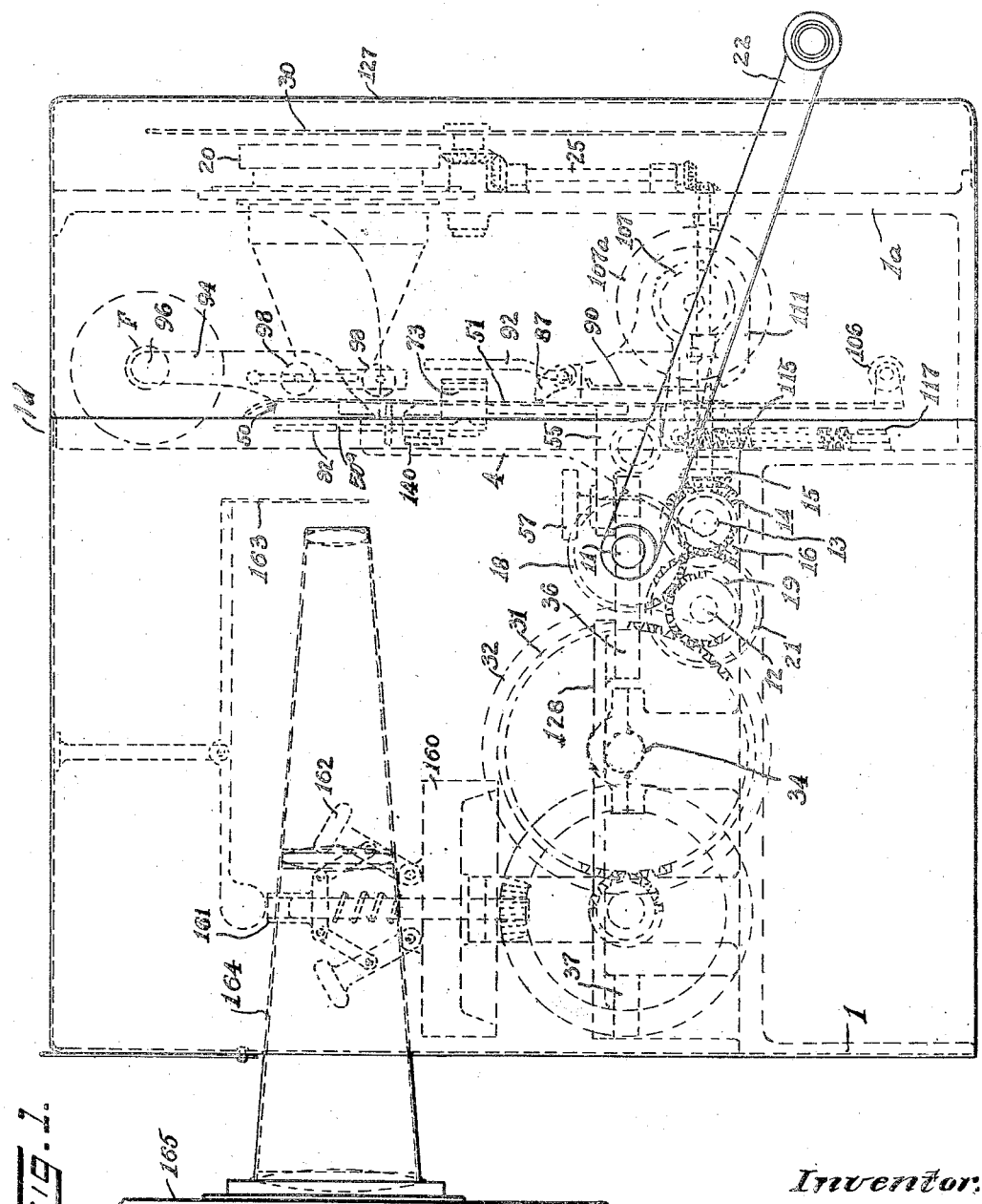

Nov. 15, 1927.  
C. E. WHITEMAN  
1,649,331  
MOTION PICTURE CAMERA AND PICTURE PROJECTING MACHINE  
Filed May 24, 1922  
6 Sheets-Sheet 3
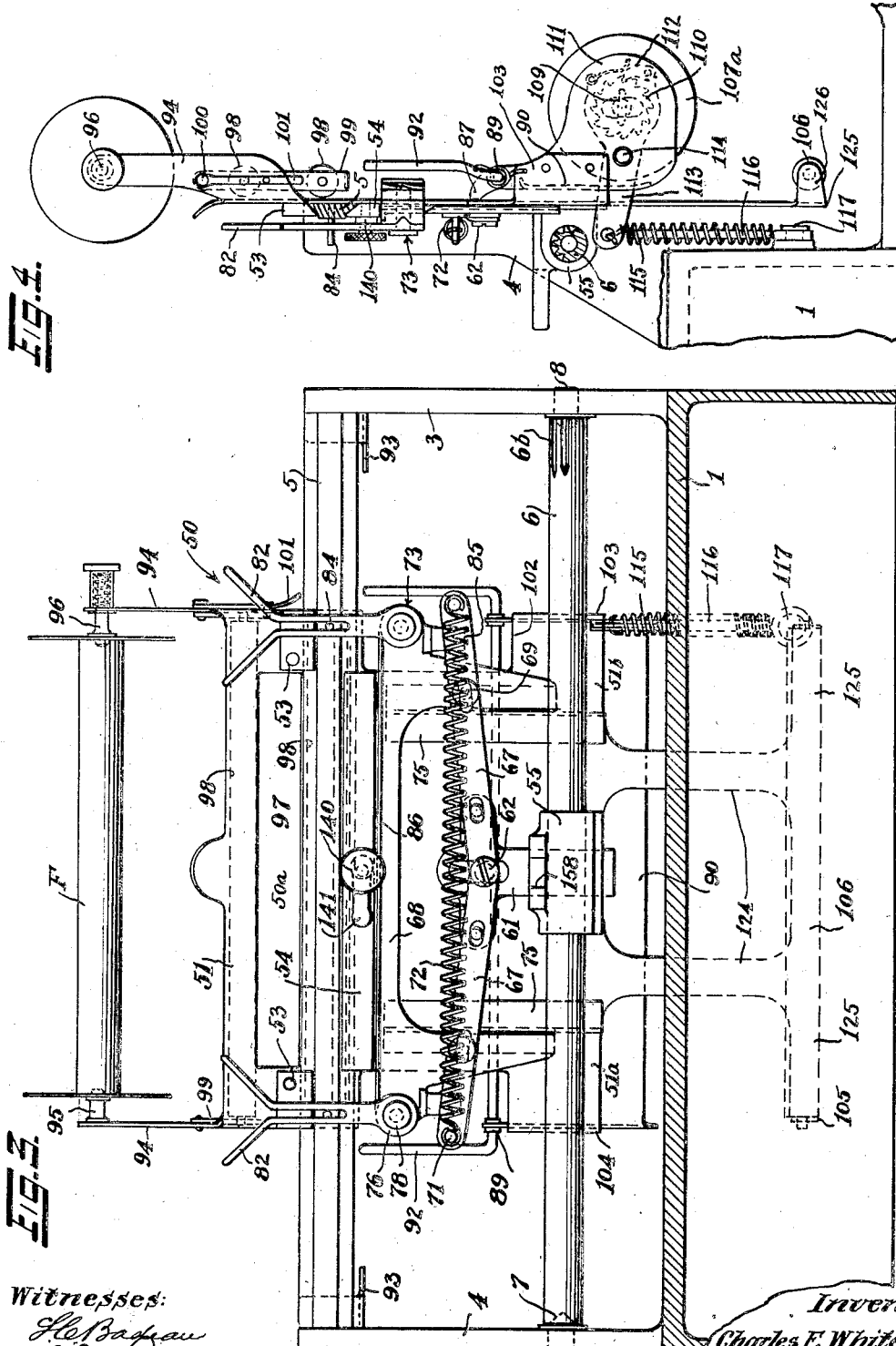

Nov. 15, 1927.
C. E. WHITEMAN
1,649,331
MOTION PICTURE CAMERA AND PICTURE PROJECTING MACHINE
Filed May 24, 1922      6 Sheets-Sheet 4
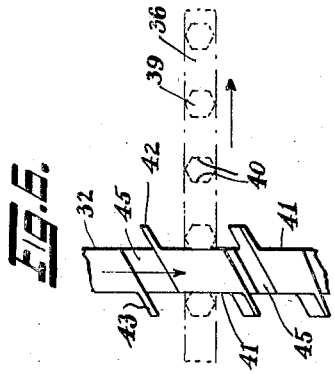
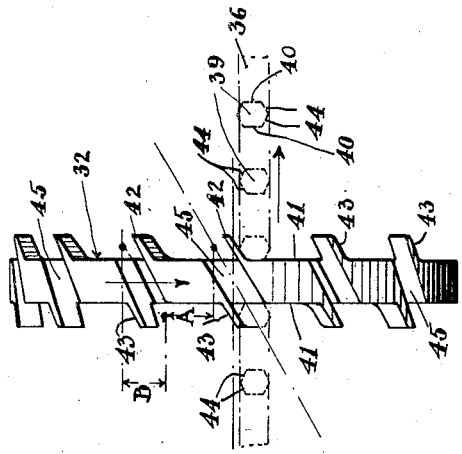
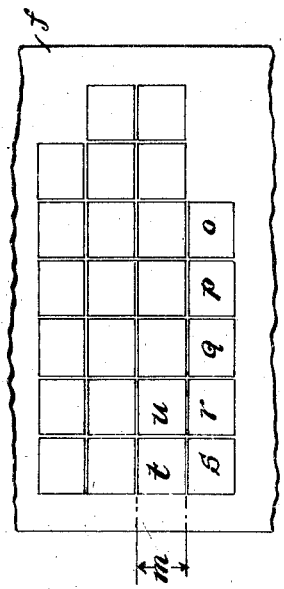
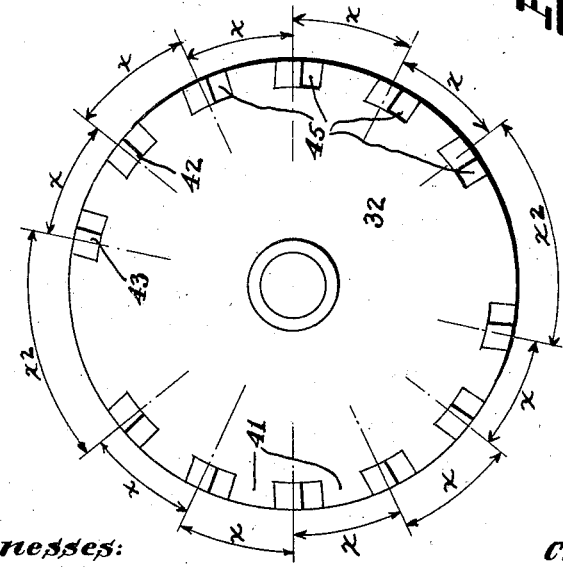
Witnesses:
Inventor:
Charles E. Whiteman,
By his Atty,

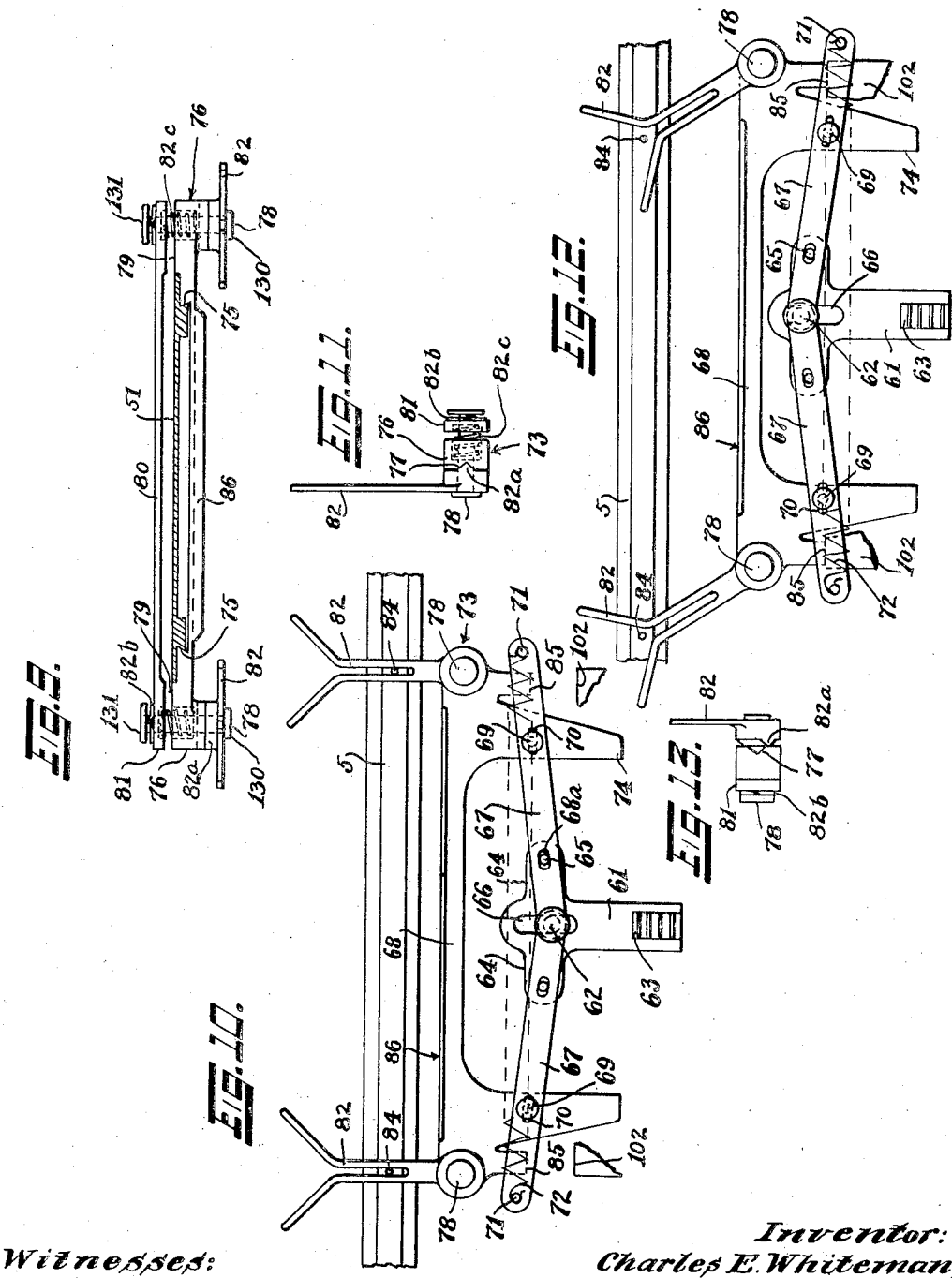

Nov. 15, 1927.
C. E. WHITEMAN
1,649,331
MOTION PICTURE CAMERA AND PICTURE PROJECTING MACHINE
Filed May 24, 1922
6 Sheets-Sheet 6
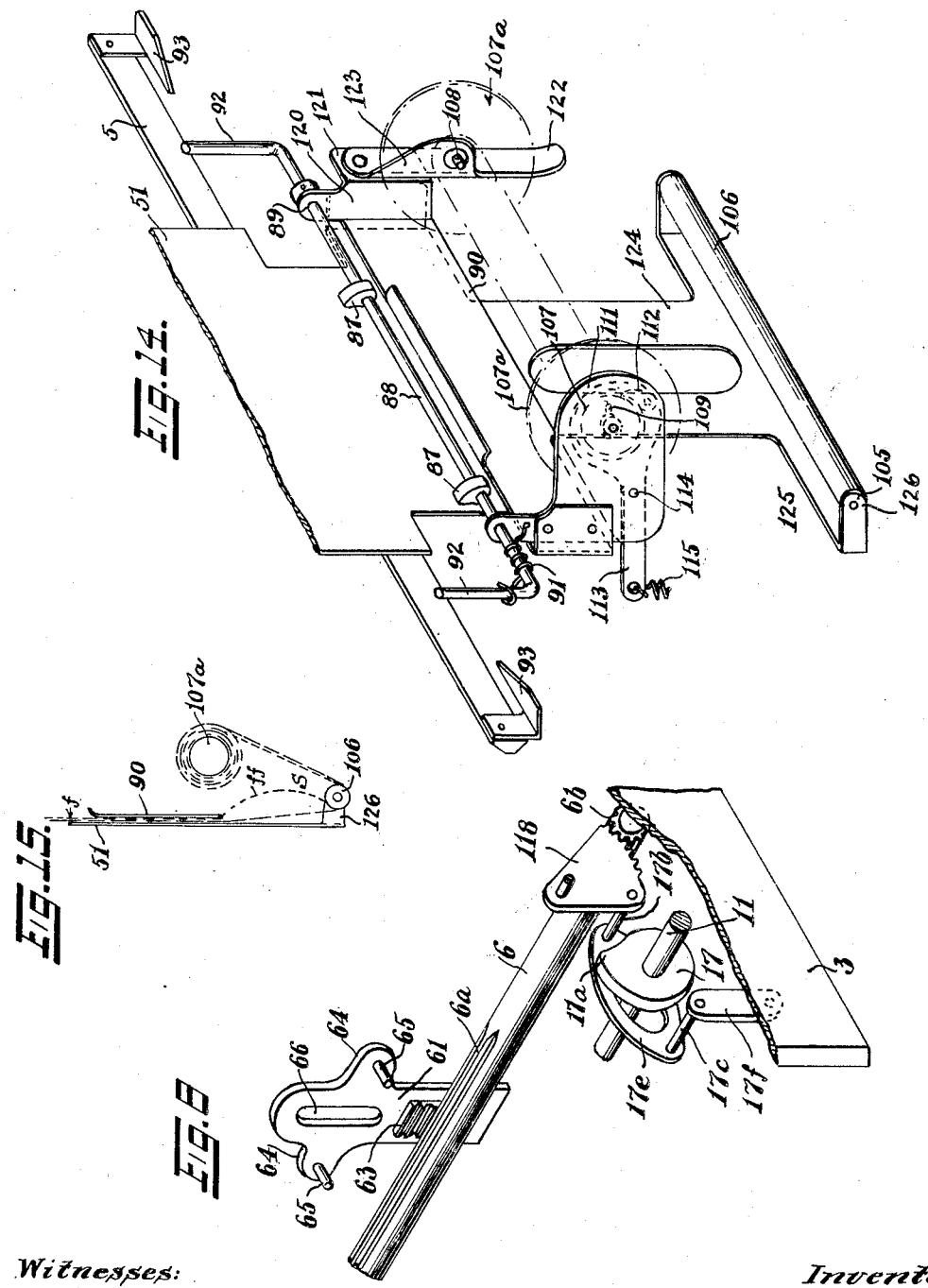
Witnesses:
Inventor:
Charles E. Whiteman,
By his Atty.

Patented Nov. 15, 1927.

1,649,331

UNITED STATES PATENT OFFICE.

CHARLES E. WHITEMAN, OF RICHMOND HILL, NEW YORK, ASSIGNOR, BY MESNE ASSIGNMENTS, TO JOSEPH A. GOLDEN, OF NEW YORK, N. Y.

MOTION-PICTURE CAMERA AND PICTURE-PROJECTING MACHINE.

Application filed May 24, 1922. Serial No. 563,254.

This invention relates to motion picture cameras and picture projecting machines in general and more especially to motion picture cameras and picture projecting machines adapted for use by amateurs.

For objects of the invention it is aimed to provide a machine by means of which motion pictures may be taken, may be transferred from negative to positive and may be projected.

Among other objects of the invention, it is aimed to provide a motion picture camera that will occupy a minimum amount of space, will be light in weight, can be operated with facility by the ordinary amateur not skilled in the art of photography, and that can be readily had at a comparatively low price in order to make the same attractive to amateurs, not only from the standpoint of size, weight and operation, but also from the standpoint of price.

To accomplish certain of the objects just enumerated, the invention contemplates the provision of a motion picture camera adapted for use with an ordinary commercial spool film such as used with the well known kodak camera, and the provision of a motion picture camera adapted to permit of loading and unloading a film in day-light without danger or risk of exposure.

The invention further contemplates, in the interest of space conservation and weight reduction, the provision of means for taking a succession of rows of pictures, the taking of the pictures of each row in succession in a laterally direction relative to the film.

Specifically, the invention contemplates the provision of registering means for positively and accurately registering a film for each successive exposure both when the film is travelling in a lateral direction and in a longitudinal direction; the provision of means for conveying the film from an upper spool to a lower spool and providing proper tension of the film while being wound in order to protect the same against exposure; the provision of adjustable means whereby the feeding and winding means of a film may readily accommodate itself to the thickness of the film being fed and wound, whether the film be in two layers as when a negative is being transferred to a positive, whether the film is accompanied with the usual paper backing provided in a commercial spool film, or whether the film itself varies in thickness;
and the provision of means for accurately adjusting for the shrinkage of films both laterally and longitudinally so that the same machine after having been used for taking the pictures of a film, may after adjustment for shrinkage, be used for transferring the negative to a positive film, and after further adjustment be used for projecting the finally produced positive film.

These and other features, capabilities and advantages of the invention will appear from the subjoined detailed description of one specific embodiment of the invention illustrated in the accompanying drawings in which

Figure 1 is a side elevation of the machine housing with the mechanism therein shown in dotted lines, and part of the lamp housing with condensing lens tubing in place ready for projection;

Fig. 2 is a plan with part of the housing removed, showing part of the mechanism for manipulating the film;

Fig. 3 is an elevation from the rear showing the film carrier and part of the gripping mechanism;

Fig. 4 is an end elevation of the film carrier shown in Fig. 3 with the side bracket removed;

Fig. 5 is an end elevation detached of a locking cam shown associated in Fig. 2 with the film manipulating mechanism, and Fig. 6 is a fragmentary view of the same locking cam, these two figures illustrating successive operative positions of the cam relative to cam pins;

Fig. 7 is a side elevation of the locking cam shown in Figs. 5 and 6;

Fig. 8 is a fragmentary view in perspective showing part of the mechanism for reciprocating the film carrier;

Fig. 8$^a$ is a fragmentary view of part of a film illustrating the location of pictures on a film taken in accordance with the present invention;

Fig. 9 is a plan of the film carrier partly in section;

Fig. 10 is a fragmentary rear elevation of part of the film carrier;

Fig. 11 is a fragmentary end elevation of the part illustrated in Fig. 10;

Fig. 12 is a rear elevation similar to Fig. 10 of part of the film carrier showing the same in one of its endwise limits of travel;

Fig. 13 is a fragmentary view showing in end elevation, part of the mechanism illustrated in Fig. 12;

Fig. 14 is a perspective view showing the forward side of part of the film carrier; and Fig. 15 is a diagrammatic end view of part of the film carrier illustrated in Fig. 14.

In the embodiment illustrated, see Figs. 1 and 2, there are shown two housing sections 1 and 1ª, which are connected to one another in any suitable manner so that a positive and accurate registration of the two sections is attained, and therewith positive and accurate registration of the mechanisms contained by the respective sections. In the present instance, the hinges 1ᵈ are provided along the opposing edges of the sections 1 and 1ª on one side, by which the sections are pivoted to one another, and the pin and socket arrangement 1ˢ provided along the opposing edges of the sections 1 and 1ª on the other side, by which the sections are positively and accurately anchored to one another in a predetermined registered position relative to one another.

At the opposite sides of the section 1, adjacent to its front end, are provided the brackets 3 and 4, at the upper ends of which brackets 3 and 4, is secured the rail 5 Fig. 4 bevelled at the upper and lower ends of its rear face; and a short distance removed from the lower ends of the brackets 3 and 4, at 7 and 8, there is journalled the cylindrical bar 6 provided at its intermediate portion with the elongated teeth 6ª and at its end adjacent to bracket 3 with the teeth 6ᵇ.

On the rail 5 there is reciprocably mounted the film carrier 50 to overhang into housing section 1ª and reciprocated transversely thereof.

The carrier 50 comprises essentially a sheet metal frame or body portion 51 travelling along the front face of the rail 5 with an elongated opening 50ª formed therein above and parallel to the rail 5 to accommodate the passage of light, there to be intercepted by a portion of a film. Only a portion of the opening 50ª will be exposed at any one time in the present instance, for the passage of light rays. The body portion 51 terminates at its upper end in forwardly bent, upwardly extending arms 94, 94, and at the upper ends thereof, there are mounted the journal pins 95, 96 for receiving the film spool F in Fig. 3.

The body portion 51 is held in place on the rail 5 by means of the bevelled face block 53, Fig. 3 disposed on either side of the opening 50ª and engaging the rear edge of the rail 5, the block 54 secured to the body portion 51 below the rail 5 engaging the lower rear edge of the rail 5.

The body portion 51 extends downwardly below the rail 5 forming the laterally extending arms 51ª and 51ᵇ, terminating in the forwardly extending portions 103, 104, to which are secured the forwardly extending bracket portions 111 and 120 of the apron 90. The bracket portion 120 has a laterally extending arm 121 to which is pivotally connected a depending finger 122 having a forwardly extending lip 123 provided with a bearing pin 108. On 111 there is pivotally mounted the disk 107 having a locking pin 109 between which and the pin 108 the lower receiving film spool is mounted, the disk being accurate to rotate the lower film spool in the usual way.

The body portion 51 extends below the arms 51ª and 51ᵇ in the form of the bracket 124, Figs. 3 and 4 terminating in the laterally extending arm 125 having forwardly extending finger portions 126, 126, between which is journalled the roller 106.

The apron 90 depends a considerable distance to form an extended guiding surface for maintaining the film straight and practically in contact with the bracket 124, while passing to the roller 106.

The portions 94, 94, as shown in Figs. 3 and 4, support the rollers 98, 98, adjacent to the body portion 51, one roller above the opening 50ª and the other below the opening 50ª.

In the course of operation the new film spool will be secured to the brackets 94, 94, at the upper end of the body portion 51, and the film thereupon passed down between the rollers 98, 98 and the body portion 51, across the opening 50ª, and then down between the apron 90 and the arms 51ª and 51ᵇ, then down below the roller 106 and up to the receiving spool mounted between the disk 107 and the bracket 122.

As shown in Figs. 1 and 2, the opening 50ª is in line with the opening 127 in the housing section 1ª so that when projecting, the picture registering with the opening 127 may be projected through said opening upon the screen, or in turn when taking pictures, disposed in the opening 50ª registering with the opening 127 may be exposed for taking a picture.

The present invention contemplates means for taking a series of pictures successively in a row transversely of the film, and to project such pictures in the same order. To this end the elongated opening 50ª is provided in the carrier 51, and the carrier will be reciprocated transversely, and successive parts of the strip registering with said opening 50ª will register with the opening 127 to receive a picture or to project one.

The mechanism for reciprocating the carrier will now be described. On the bar 6 there is slidably mounted the bracket 55 which is recessed at its forward end to receive the vertically reciprocating slide 61, Figs. 2 and 10, which has a vertically extending slot 66 to receive the pin 62 secured to the body portion 51 anchoring the bracket 55 against lateral movement but permitting vertical movement of the same. The bracket 55 has a forwardly extending bifurcated portion 56 through which extends the pin 57 secured to the forwardly extending arm 58 of the sector 36 which is pivoted at its rear end to the post 37, secured in the present instance adjacent to the rear end of the section 1. The sector 36 is of wish bone shape having an arcuate portion 128 extending into the arm 58 in its forward direction and provided with the pins 39 extending from the rear concave face of the arcuate portion. The pins 39, in the present instance, form with the portion 128 seven recesses of equal width. The sector 36 will be oscillated about its pivotal pin 37 by means of the cam wheel 32 which is affixed to the shaft 33 journalled in supports 34 and 35, secured to the base of the section 1 and having secured thereto the large gear 31, Fig. 1, adjacent to the support 34. The gear 31 is in mesh with the pinion 19 secured to the idler shaft 12, journalled at one end in the support 3 and at the other end in the support 9 secured to the base of the section 1. The pinion 19 in turn is in mesh with the gear 18 secured to the driving shaft 11 journalled in the supports 9 and 3 and extending outwardly to receive the handle lever 22. Thus by rotating the handle 22 the sector 36 will be oscillated to reciprocate in turn the carrier 51.

The cam wheel 32, see particularly Figs. 2, 5, 6 and 7, has a plurality of grooves 45 arranged in two sets, of six grooves each, extending diagonally across the periphery of the wheel 32 at an angle of approximately thirty degrees (30°), one set of grooves extending in one direction and the other in the opposite direction, see Fig. 2. Extending beyond the faces of the cam wheel 32 there are a plurality of cam fingers or lips 42, 43, the lips 43 forming guides to direct the pins 39 into the grooves 45 and the lips 42 serving to assist the lips 43 in steadying the sector and cooperating with the lips 43 to initiate the oscillating action transmitted to the sector, the grooves 45 serving to complete the oscillating action, it being understood of course, that one set of grooves will oscillate the sector in one direction, and the other set in the opposite direction. The pins 39 as clearly shown in Figs. 5 and 6 are hexagonal in cross-section, the faces 50 of each conforming to the angle thirty degrees (30°), of the grooves 45 in order to properly cooperate with the same and guard against play. The hexagonal shape of the pins also affords extended surface areas for the cam faces of the pins conducive to the maximum longevity of the working efficiency of the pins.

It will be seen that only one lug or pin 39 may pass through a slot at one time and that immediately thereafter the faces 41 of the cam 32, see Figs. 5 and 6, will engage the faces 44 of the two successive lugs 39 and thus hold the sector 36 firmly against further lateral movement until a succeeding lip 43 is engaged by a lug 39 in the order of succession.

As previously set forth it is an object of the invention to provide an arrangement whereby a plurality of pictures to a row may be taken laterally of a film. As one embodiment of means for accomplishing this there is here illustrated a construction for taking seven pictures to a row. In Fig. 8ᵃ there is illustrated a diagram of the pictures as they will appear on the film when taken. To this end the sector 36 is provided with seven divisions as above set forth and the cam wheel 32 provided with six grooves with its appurtenant lips to each set of grooves. The divisions formed in the sector in width equal the width of the cam wheel in order to facilitate steadying the sector by means of the cam wheel, as already set forth. The spaces between successive grooves of each set of grooves are equal to a predetermined distance according to the dwell or rest required in the lateral movement of the film to produce an exposure. The distances between the sets of grooves are equal to a predetermined distance greater than twice the distance between two successive grooves of a set, for the purpose hereinafter to be described. As shown in Fig. 2, the relation of the sector to the cam wheel, when assembled, will be such that the end of stroke of the sector will coincide with the extended dwell between successive sets of grooves 45. It will be seen from the foregoing that the cam wheel 32 will advance the sector 36 through seven periods of rest in one direction and then further resting a period greater than twice the period of rest between successive grooves of a single set of grooves, will return the sector through a second succession of seven periods of rest and so continue. During the periods of rest provision is made for taking the pictures.

In the present instance, it has been found desirable to make the time of rest approximately equal to the time of motion, in order to accommodate the shutter 30 which is rotating uninterruptedly as presently to be described. To this end, it will be seen, as shown in Fig. 5, that the distance A along the cam wheel 32 is approximately the same as the distance B along the cam wheel 32.

The shutter 30, 30, as are all the working parts of the machine, will be operated by the rotation of the handle 22. The handle shaft 11 has secured thereto the gear 18, Fig. 1 meshing with the pinion 19 on the idler shaft 12, on which is mounted the gear 21 directly connected to the pinion 19 and meshing with the gear 16 affixed to the counter shaft 13, to which is also fixed the bevelled gear 14 meshing with the bevelled gear 15 connected by a stub shaft to one face of the clutch 23, Fig. 2. The other face of the clutch 23 is secured to the shaft 24 mounted in the section 1ᵃ, the faces of the clutch 23 being adapted to engage when the housing sections 1 and 1ᵃ are swung into closed position as shown in Figs. 1 and 2. The shutter, of usual construction, for cooperating with the lens opening of the lens 20 extending through the wall 1ᶜ, is supported adjacent to the wall 1ᶜ, and as shown in Fig. 2, is operatively connected by means of the shafts 25 and 24 and intermediate bevel gears to the clutch 23 so that the actuation of the handle 11 will cause the shutter 30 to be rotated.

During the extended period of rest at the end of stroke of the sector 36 before its return, two pictures will be taken, a picture during the first half of the period of rest, whereupon the film will be advanced a distance, to start a new row of pictures and thereafter during the last half of said extended period of rest a second picture will be taken, constituting the first picture of the new row. This extended period of rest and the advance of the film is timed so that the shutter will have afforded two exposures, one during the first half of the extended period of rest and the other during the last half of the extended period of rest.

The longitudinal feeding of the film will now be described. The slide 61, as shown in Figs. 3, 8, 10 and 11, has a toothed portion 63 on its lower rear face in mesh with the teeth 6ᵃ of the bar 6. On the shaft 11 is fixed the cam 17 having the lobe 17ᵃ which with every rotation of the shaft 11 will cause the bar itself to be intermittently rocked to and fro by successively striking the pin 17ᵇ at one half of its turn and the pin 17ᶜ during the other half of its turn about one hundred and eighty degrees. The pin 17ᶜ is pivotally connected to the link 17ᶠ which is pivotally connected to the bracket 3 and to the elliptical link 17ᵉ through the enlarged opening of which the shaft 11 extends. The pin 17ᵇ pivotally connects the other end of the link 17ᵉ to the sector 118 pivotally connected to the bracket 3 and in mesh with the teeth 6ᵇ.

Extending from the upper portion of the slide 61 and substantially at right angles to the slot 66, there are provided the arm portions 64, see Figs. 8, 10 and 12. There are provided two lever arms 67 pivotally connected at their adjacent ends to the pin 62 secured to the body portion 51 and extending through the elongated slot 66. The arms 67 have the laterally extending slots 68ᵃ to receive the pins 65 of the arms 64, and have laterally extending slots 70 to receive the studs 69 secured to the depending portions 74 of the rear gripping member 68. The depending portions 74 have forwardly extending portions forming slide-ways engaging the slide tracks 75 integral with the main body portion 51 and extending forwardly therefrom. The outer ends of the arms 67 are provided with pins 71 to form two abutments for the tensile spring 72 to connect the outer ends of the arms 67 to one another. The gripping member 68 as shown in Fig. 3, is provided with a flange 86 to cooperate either with the block 54 or the eccentric cam 140 pivotally connected to the block 54 to limit the upward movement of the rear gripping member 68.

As constituting the forward gripping member to cooperate with the rear gripping member 68, there is provided the bar 80 having enlargements 81 at both ends, see Fig. 9, for engaging the film between such enlargements and the faces 79 of the rear gripping member 68. The bar 80 is anchored to the gripping member 68 by means of the pins extending through the ends of the two gripping members. There are provided recesses around the opening in the members 76 and 80 facing one another to form seats for the springs 82ᶜ surrounding the pins 78 and serving to open the gripping members. For closing the gripping members there are provided the Y-shaped upwardly extended members 82 which are pivotally connected at their lower ends to the pins 78, the pins 78 having heads 130 and 131 on their rear and forward ends respectively for maintaining the parts in place. The bifurcations of the members 82 cooperate with the pins 84 secured to the rail 5, as shown in Figs. 10 and 12. The lower ends of the members 82 are provided with bosses which have projections 82ᵃ to sit into the V-shaped recesses 77 formed in the adjacent ends of the gripping member, 68 as shown in Fig. 11. Just below the pins 78 the member 68 is provided with the depending portions 85 Fig. 10 which cooperate with the abutments 102 of the body member 51 to limit the downward movement of the gripping member 68.

The operation of these gripping members is as follows:

With the rotation of the handle 22, the sector 118 will be rocked to and fro in turn vertically to reciprocate the slide 61. The mechanism is so timed that the downward movement of the slide 61 will take place at both ends of travel of the carrier, Fig. 12 showing the position of the gripping member 61 at one end of travel of the carrier immediately after the gripping member 68 has been lowered. When the gripping member is in the end position of travel, the projections 82ᵃ will have been rocked out of the V-shaped recesses 77 in the member 68, into the position shown in Fig. 13, and thereby lock the jaws together, gripping the film between them. The jaws will remain so gripped until the Y-shaped members 82 will have been swung into the vertical position shown in Fig. 10 when the projections 82$^a$ register with the V-shaped recesses 77 and permit the springs 82$^c$ to open the gripping members, whereupon the film having been released, the slide 61 will be raised and with it the gripping member.

Positive action is necessary in order to prevent displacement of the film. To this end the spring 72 is provided which operates to snap the gripping member 68 to its finally raised or lowered position immediately after the slide 61 has moved the pin 62 beyond the dead center between the pins 65.

The spring washers 82$^b$, Fig. 11 serve to compensate for the variations in thickness of the film being gripped, whereby one or more layers of film may be accommodated, a layer of film with a paper backing, or variations in the film itself, without impairing the gripping efficiency of the jaws themselves.

To assist the gripping members 68 and 80 and to cooperate with the same during the feeding action, an auxiliary feeding device is provided. The auxiliary gripping device consists in the locking jaws 87, Fig. 14 formed on the rod 88 supported by the ears formed at the upper ends of the brackets 111 and 120. The rod 88 has forwardly extended end portions 92 adapted to engage as the carrier approaches its end positions of travel, the cam faces 93 formed at the ends of the rail 5. For resiliently maintaining the jaws 87 in locking position, the spring 91 is wrapped around one of the end portions 92 and secured to the bracket 111 in the usual way. It will be seen from the foregoing that as the carrier approaches either of its end positions of travel the end portion 92 will be engaged by a cam face 93 and thereupon rock the rod 88 to withdraw the jaws 87. Thus the film will be released at this time to permit the feed jaws 68 and 80 to advance the film. In turn as the feeding jaws are released, it will be seen that the auxiliary gripping jaws 87 will be in gripping position to securely hold the film against displacement.

For operating the take-up spool 107$^a$, as shown in Fig. 14, to properly take up the film and maintain it wound up under desirable tension, there is provided the well known pawl and ratchet mechanism 110, the ratchet wheel being part of the spool rotating means and being located between the disk 107 and the bracket 111, see Fig. 2, and the pawl 112 being fastened to the rock arm 113 pivotally connected at 114 to the bracket 111. The arm 113 has a rearward extension connected to the spring 115 supported on the rod 116 pivotally connected by the stud 117 to the housing section. By means of the foregoing it will be seen that with every movement of the carrier in a direction from the stud 117, the arm 113 will be depressed and actuate the pawl and ratchet mechanism 110 thereby to impart a partial rotation to the spool 107$^a$. It will further be seen, that if the film is tightly wound and the movement of the arm 113 thereby impeded, the spring 115 will take up the strain without transmitting any appreciable strain to the film.

Referring to Fig. 15, it will be noted that by the employment of the roll 106 buckling of the film, as at $ff$, incident to the winding of the paper and film, is provided for, and tendency of the film to push back through the locking jaw is prevented.

In Fig. 1, there is shown in dotted lines a fly-wheel 160 driven from gear 31 through successive gears, and mounted on the shaft 161 to the upper end of which is connected the well known type of governor 162 which is operatively connected with the fire shutter 163 in the well known manner.

In Fig. 1, there is also shown in operative position, the projection lens tubing 164 inserted through the back of the camera and extending from a lamp housing 165.

It is an aim of the present invention to permit the use of a motion picture camera not only for taking pictures, but also, when desirable or in the absence of any well known means for so doing, for reproducing positives from negatives made by the same camera, and for projecting the reproduced positives from the same camera. Obviously to do this, provision must be made for taking care of the shrinkage which takes place in the film during the development of the same. This shrinkage of course, takes place in a longitudinal as well as a lateral direction. To this end, in the present instance, for taking care of the longitudinal shrinkage, the cam 140 is provided, see Fig. 3, which when manipulated by the handle 141 will thrust the enlarged portion thereof into the path of the flange 86 and thus diminish the extent of throw of the feed according to the shrinkage to be accommodated; and for taking care of the lateral shrinkage, the cam 135 formed on the pin 57 is provided which when actuated by the handle 157 may move the enlarged portion of the cam toward the center of rotation 37 of the sector 36, and thus diminish the throw of the carrier 50 by the sector 36 during its successive steps by the gradually increasing enlargement of the cams 140 and 135, the device may be adjusted for a greater or lesser shrinkage, according to the conditions, to wit: To accommodate shrinkage of the developed negative, of the developed positive and to accommodate the shrinkage which might arise from other conditions.

The operation of the device is as follows:

Having procured an ordinary commercial film, the loading being similar to that with an ordinary still camera, the section 1ª, is opened and the film and paper covering is placed upon the upper spool carrier. The pressure rollers 98 are thereupon raised, the carrier 50 placed in the center of the machine, with the gripping members 68 and 80 opened. Then, upon retracting the auxiliary locking jaws 87, the film and paper can be passed down beyond the apron 90, under the guide roller 106 and up on to the take-up spool 107ª.

The camera may now be placed upon a tripod and is ready to take pictures.

It will be seen from the description of the various mechanisms and the drawings, and the operation of the machine, as the handle 22 is turned, the main driving mechanism will function, turning the shutter 30 at the proper speed, driving the cam 32 to cause the sector 36 to oscillate and thereby reciprocate the carrier 50 back and forth intermittently with absolute registration, making seven distinct stops each way. At the end of the said travel of the carrier, the film is moved down by the gripping members 68 and 80 and at the center of the travel of the carrier, these gripping members are returned, the lowering and raising of the gripping members being accomplished by the cam 17 of the main driving shaft 11 cooperating with the pins 17ᵇ and 17ᶜ, respectively, and oscillating the lever or sector 118 to rock the shaft 6, thereby causing the several parts of the feeding mechanism to function, the spring 72 fulcrumed on the levers 67, causing the gripping members 68 and 80 to snap down or up, without loss of motion to ensure proper registration.

While the film carrier is moved toward the center of the machine the gripping jaws 68 and 80 are gradually opened by the action of the arms 82 swinging about the pins 84, and remain opened until the gripping members have been raised, when the jaws will close as soon as the projections 82ᵃ will have been actuated out of the V-shaped recess 77. As the carrier approaches the end positions of travel, the arms 92 of the auxiliary locking jaws 87 will be engaged by the cams 93 to disengage the locking jaws 87, in turn to release the film so that the feeding jaws can advance the film longitudinally.

As the carrier moves away again, the auxiliary jaws 87 again lock, and remain so, until the carrier has reached its opposite end position of travel, when the action is repeated.

As the film is fed down, it is tightly wound up on the take-up spool 107ª, the arm 113 controlling the pawl 112, being caused to oscillate by the spring lever arm or compensating arm 115, which spring arm will absorb the strain transmitted to it should the film be tightly wound on the spool 107ª and thus protect the film against injury.

After the film has passed through the camera, the camera can then be opened and the film taken out and developed in the usual way. After adjustment of the present camera for any shrinkage of the negative, the positive can be printed in the camera, or the negative can be removed from the camera and the positive obtained in any well known manner, and the positive however obtained from said negative, can be projected by the present camera after adjustment of the before described means of the camera for shrinkage of the positive.

From the foregoing it will be seen, that the orifice 127 registering with the lens 20 will direct the light passage when taking a picture, that the condensing lens 164 will direct the light passage when reproducing positives from negatives, in which case the orifice 127 is preferably closed; and that the condensing lens 164, lens 20 and orifice 127 will direct the light passage when projecting pictures.

It is obvious that various changes and modifications may be made to the details of construction without departing from the spirit of the invention set forth in the appended claims.

I claim:—

1. The combination with a housing having a light receiving passage, of a rail, a carrier slidably mounted on said rail, film spools supported on said carrier, a film carried by said spools to intercept the light passage, means for imparting lateral motion to said carrier to cause successive areas of said film in a lateral direction to intercept said light passage, gripping jaws mounted on said carrier along the sides of the path of movement of the film, cams for closing said jaws on the film, springs for opening said jaws, links secured to said cams, pins on said rail engaging said links to rock said links as the carrier is moved laterally thereby to close said jaws at the endwise limits of travel of the carrier and to permit said springs to open said jaws at the intermediate position of the carrier between its endwise limits of travel, and means for imparting a longitudinal movement to said grippers at the endwise limits of travel of the carrier thereby to cause the film to be moved in a longitudinal direction and for imparting a return movement to said grippers at the intermediate position of the carrier to permit the grippers to return for a fresh hold on the film.

2. The combination with a housing having a light receiving passage, of a rail, a carrier slidably mounted on said rail, film spools supported on said carrier, a film carried by said spools to intercept the light passage, means for imparting lateral motion to said carrier to cause successive areas of said film in a lateral direction to intercept said light passage, gripping jaws mounted on said carrier along the sides of the path of movement of the film, cams for closing said jaws on the film, springs for opening said jaws, links secured to said cams, pins on said rail engaging said links to rock said links as the carrier is moved laterally thereby to close said jaws at the endwise limits of travel of the carrier and to permit said springs to open said jaws at the intermediate position of the carrier between its endwise limits of travel, means for imparting a longitudinal movement to said grippers at the endwise limits of travel of the carrier thereby to cause the film to be moved in a longitudinal direction and for imparting a return movement to said grippers at the intermediate position of the carrier to permit the grippers to return for a fresh hold on the film, and spring washers associated with said grippers to accommodate for variations in the thicknesses of the film being fed.

3. The combination with a housing having a light receiving passage, of a carrier slidably supported in said housing, film spools supported on said carrier, a film carried by said spools to intercept the light passage, means for imparting a lateral motion to said carrier to cause successive areas of said film in a lateral direction to intercept said light passage, feed gripping jaws mounted on said carrier, means for closing said jaws upon the film at the endwise limits of travel of said carrier, means for opening said jaws at the intermediate position of said carrier, means for imparting a longitudinal movement to said feed jaws at the endwise limits of travel of the carrier thereby to cause the film to be moved in a longitudinal direction and for imparting a return movement to said jaws when opened at the intermediate position of the carrier, and auxiliary jaws for holding said film while said feed jaws are being returned.

4. The combination with a housing having a light receiving passage, of a carrier slidably mounted in said housing, film spools supported on said carrier, a film carried by said spools to intercept the light passage, means for imparting a lateral motion to said carrier to cause successive areas of said film in a lateral direction to intercept said light passage, feed gripping jaws mounted on said carrier, means for closing said jaws upon the film at the endwise limits of travel of said carrier, means for opening said jaws at the intermediate position of said carrier, means for imparting a longitudinal movement to said feed jaws at the endwise limits of travel of the carrier thereby to cause the film to be moved in a longitudinal direction and for imparting a return movement to said jaws when opened at the intermediate position of the carrier, auxiliary jaws for holding said film while said feeding jaws are being returned, and means for disengaging the film from said auxiliary jaws at the endwise limits of travel of the carrier to permit the film to be moved longitudinally by the feed jaws.

5. The combination with a housing having a light receiving passage, of a carrier slidably mounted in said housing, film spools supported on said carrier, a film carried by said spools to intercept the light passage, means for imparting a lateral motion to said carrier to cause successive areas of said film in a lateral direction to intercept said light passage, feed gripping jaws mounted on said carrier, means for closing said jaws upon the film at the endwise limits of travel of said carrier, means for opening said jaws at the intermediate position of said carrier, means for imparting a longitudinal movement to said feed jaws at the endwise limits of travel of the carrier thereby to cause the film to be moved in a longitudinal direction and for imparting a return movement to said jaws when opened at the intermediate position of the carrier, a rod, auxiliary jaws mounted on said rod, resilient means for normally maintaining said auxiliary jaws in film engaging position, extensions on said rod, cams for engaging said extensions to rock said auxiliary jaws out of engagement of the film at the endwise limits of travel of the carrier to permit the film to be advanced by the feed jaws.

6. The combination with a housing having a light receiving passage, a rail, a carrier slidably supported on said rail, film spools supported on said carrier, a film carried by said spools to intercept the light passage, means for imparting a lateral motion to said carrier to successive areas of said film in a lateral direction to intercept said light passage, feed gripping jaws mounted on said carrier, means for closing said jaws upon the film at the endwise limits of travel of the said carrier, means for opening said jaws at the intermediate position of said carrier, means for imparting longitudinal movement to said feed jaws at the endwise limits of travel of the carrier thereby to cause the film to be moved in a longitudinal direction and for imparting a return movement to said jaws while open at the intermediate position of the carrier, a rod, auxiliary jaws mounted on said rod, resilient means for normally maintaining said auxiliary jaws in film engaging position, extensions on said rod, cams on said rail engaged by said extensions when the carrier approaches its endwise limits of travel thereby to rock said auxiliary jaws out of engagement with the film at the endwise limits of travel of the carrier to permit the film to be advanced by the feed jaws.

7. The combination with a housing having a light receiving passage, of a carrier slidably mounted in said housing, film spools mounted on said carrier for carrying a film to intercept the light passage, means for feeding said film from one spool to the other, a pawl and ratchet connected to said other spool, a pawl lever operatively associated with said pawl to rotate said other spool to wind the film thereupon, a spring arm pivotally connected to the housing at one end and the other end to said pawl lever whereby the pawl lever will be rocked when the carrier is moved laterally and when no slack is present in the film, the pawl lever not rocking any further when the slack in the film has been taken up at which time the spring of the spring arm will take the strain to protect the film against injury.

8. The combination with a housing having a light receiving passage, of a carrier slidably mounted in said housing, a film supported in said carrier to intercept the light passage, a sector having an arcuate arm and pivotally connected to said housing, a bracket secured to said carrier and operatively connected to said sector, teeth on said arcuate arm, and a cam wheel cooperating with said teeth for imparting an intermittent step by step movement to said sector in turn alternately to impart a step by step movement to said carrier.

9. The combination with a housing having a light receiving passage, of a carrier slidably mounted in said housing, a film supported in said carrier to intercept the light passage, a sector having an arcuate arm and pivotally connected to said housing, a bracket secured to said carrier and having a bifurcated end, a pin formed on said sector cooperating with said bifurcated element, teeth on the arcuate arm of said sector, a cam wheel, means for rotating said cam wheel, said cam wheel having two sets of grooves, one set of grooves cooperating with said teeth to impart an intermittent movement to said sector in one direction, and the other set cooperating with said teeth to impart intermittent movement to said sector in the other direction whereby an alternate intermittent movement will be transmitted to said carrier first in one direction and then in the other direction.

10. The combination with a housing having a light receiving passage, of a carrier slidably mounted in said housing, a film supported in said carrier to intercept the light passage, a sector having an arcuate arm and pivotally connected to said housing, a bracket secured to said carrier and having a bifurcated end, a pin formed on said sector cooperating with said bifurcated element, teeth on the arcuate arm of said sector, a cam wheel, means for rotating said cam wheel, said cam wheel having two sets of grooves on its periphery, one set of grooves being inclined in one direction and cooperating with said teeth to impart an intermittent movement to said sector in one direction, and the other set of grooves being inclined in the opposite direction and cooperating with said teeth to impart an intermittent movement to said sector in the opposite direction.

11. The combination with a housing having a light receiving passage, of a carrier slidably mounted in said housing, a film supported in said carrier to intercept the light passage, a sector having an arcuate arm and pivotally connected to said housing, a bracket secured to said carrier and having a bifurcated end, a pin formed on said sector cooperating with said bifurcated element, teeth on the arcuate arm of said sector, a cam wheel, means for rotating said cam wheel, said cam wheel having two sets of grooves on its periphery, one set of grooves being inclined in one direction and cooperating with said teeth to impart an intermittent movement to said sector in one direction, and the other set of grooves being inclined in the opposite direction and cooperating with said teeth to impart an intermittent movement to said sector in the opposite direction, and lips formed on the faces of said cam wheel adjacent to said grooves to guide the teeth into said grooves.

12. The combination with a housing having a light receiving passage, of a carrier slidably mounted in said housing, a film supported in said carrier to intercept the light passage, a sector having an arcuate arm and pivotally connected to said housing, a bracket secured to said carrier and having a bifurcated end, a pin formed on said sector cooperating with said bifurcated element, teeth on the arcuate arm of said sector, a cam wheel, means for rotating said cam wheel, said cam wheel having grooves along its periphery inclined relative to the axis of said wheel, and lips formed on the faces of the cam wheel to guide said teeth successively into said grooves whereby an intermittent movement will be transmitted to said carrier.

13. The combination with a housing having a light receiving passage, of a carrier slidably mounted in said housing, a film supported in said carrier to intercept the light passage, a sector having an arcuate arm and pivotally connected to said housing, a bracket secured to said carrier and having a bifurcated end, a pin formed on said sector cooperating with said bifurcated element, teeth on the arcuate arm of said sector, a cam wheel, means for rotating said cam wheel, said cam wheel having grooves in its periphery and inclined relative to the axis of said wheel, a lip formed on the remote side of the entrance to the groove, another lip formed on the inner side of the exit of the groove to guide said teeth successively into said grooves and to assist the inclined grooves in imparting a lateral motion to the sector and in turn to the carrier.

14. The combination with a housing having a light receiving passage, of a carrier slidably mounted in said housing, a film supported in said carrier to intercept the light passage, a sector having an arcuate arm and pivotally connected to said housing, a bracket secured to said carrier and having a bifurcated end, a pin formed on said sector cooperating with said bifurcated element, teeth on the arcuate arm of said sector, a cam wheel, means for rotating said cam wheel, said cam wheel having two sets of grooves in its periphery, the sets being inclined in opposite directions relative to the axis of the wheel, the grooves of each set spaced an equal distance apart, the sets spaced apart a distance greater than twice the space between the grooves of a set, the teeth forming spaces in the sector equal to the width of the cam wheel and the grooves for operating with the teeth to impart an intermittent lateral motion to the sector in turn to impart a lateral motion to the carrier, the teeth cooperating with the faces of the cam wheel when a groove is engaged to maintain the sector against movement, means for actuating the film in a longitudinal direction when the teeth engage the faces of the cam wheel adjacent to the long space between successive sets of grooves to permit two areas of film in successive rows of areas to intercept the light passage before the carrier is again moved.

15. The combination with a housing having a light receiving passage, of a carrier slidably mounted in said housing, a film supported in said carrier to intercept the light passage, a sector having an arcuate arm and pivotally connected to said housing, a bracket secured to said carrier and having a bifurcated end, a pin formed on said sector cooperating with said bifurcated element, teeth on the arcuate arm of said sector, a cam wheel, means for rotating said cam wheel, said cam wheel having a plurality of grooves in its periphery, the grooves being inclined relative to the axis of the wheel, spaces between the grooves, the teeth forming spaces in the sector equal to the width of the cam wheel, the grooves cooperating with the teeth to impart an intermittent lateral motion to the sector in turn to impart a lateral motion to the carrier, the teeth cooperating with the faces of the cam wheel when a groove is engaged to maintain the sector against movement, the spaces between the successive grooves determining the interval of rest of the carrier.

16. The combination with a housing having a light receiving passage, of a carrier slidably mounted in said housing, a film supported in said carrier to intercept the light passage, a sector having an arcuate arm and pivotally connected to said housing, said sector being operatively connected to said carrier, hexagonal teeth on the arcuate arm of said sector, a cam wheel, means for rotating said cam wheel, said cam wheel having a plurality of grooves in its periphery, and the grooves being inclined relative to the axis of the wheel, spaces between the grooves, the teeth forming spaces in the sector equal to the teeth of the cam wheel, the grooves cooperating with the faces of the teeth to impart an intermittent lateral motion to the sector in turn to impart a lateral motion to the carrier, the faces of the teeth cooperating with the faces of the cam wheel when a groove is engaged to maintain the sector against movement, the faces of the teeth affording extended wearing surfaces for the teeth.

17. The combination with a housing having a light receiving passage, of a carrier slidably mounted in said housing for carrying a film supported in said carrier to intercept the light passage, a sector pivotally connected to the housing, a bracket secured to said carrier and having a bifurcated end, a pin extending from said sector into said bifurcated end to form an operative connection, means for oscillating said sector in turn to reciprocate said carrier, and a cam on said pin rotatable to adjust the extent of swing transmitted by the sector to take care of shrinkage.

18. The combination with a housing having a light receiving passage, of a carrier slidably mounted in said housing for carrying a film supported in said carrier to intercept the light passage, a sector pivotally connected to the housing, a bracket secured to said carrier and having a bifurcated end, a pin extending from said sector into said bifurcated end to form an operative connection, means for oscillating said sector in turn to reciprocate said carrier, and means for adjusting the extent of swing transmitted by the sector to adjust for shrinkage in a lateral direction.

19. In combination, means for supporting and laterally reciprocating a film by step-by-step movements; means for varying the amount of said movements to compensate for lateral shrinkage of the film; and means for feeding the film longitudinally.

20. In combination, means for laterally reciprocating a film; means for feeding the film longitudinally by step-by-step movements; and means for adjusting the distance of said movements for compensating for longitudinal shrinkage.

21. In combination, means for supporting and laterally reciprocating a film; a reciprocatory gripper comprising a gripping member; a movable means for actuating said member; and stationary means for actuating said movable means by the reciprocatory movement of the supporting means.

22. In combination, means for supporting a film; a reciprocatory gripper comprising a gripping member having a cam face; an oscillatory cam member engaging said face; and means for oscillating said cam member.

23. In combination, means for supporting and laterally reciprocating a film; and reciprocatory grippers comprising a pair of gripping members one of which has a cam face; an oscillatory cam member engaging said face; and means for oscillating said cam member at each end of the reciprocatory movement of the supporting means.

24. In combination, means for supporting and laterally reciprocating a film; reciprocatory grippers comprising a pair of gripping members one of which has a cam face, and an oscillatory cam member engaging said face; and stationary means for engaging and oscillating said cam member at each end of the reciprocatory movement of the supporting means.

25. In combination, means for laterally reciprocating a film step-by-step; reciprocatory grippers for gripping imperforate parts of the film for longitudinally feeding the film; and means for adjusting the distance of reciprocatory movement of the grippers for compensating for longitudinal shrinkage.

26. In combination, means for laterally reciprocating a film step-by-step; a reciprocatory gripper carrier; grippers thereon for gripping imperforate parts of the film when moving in feeding direction for longitudinally feeding the film; means positively moving the carrier in feeding direction; means for yieldably returning the carrier reverse to feeding direction; and an adjustable stop engaged by the carrier on its return stroke for adjusting the distance of reciprocatory movement of the carrier for compensating for longitudinal shrinkage.

27. In combination, a film support; and means for laterally reciprocating said support step-by-step including a reciprocatory toothed member, and means engaging the teeth of said member for reciprocating the member.

28. In combination, a film support; means for laterally reciprocating said support step-by-step including an oscillatory pivoted toothed sector and a cam having members engaging the teeth of said sector; and means for feeding the film longitudinally.

29. In combination, means for laterally reciprocating a film step-by-step including an oscillatory member; and means for varying the active effect of said member.

30. In combination, a film support; means for laterally reciprocating the film support step-by-step including an oscillatory pivoted lever member and means for oscillating said member; and means for varying the moment of said lever member to compensate for lateral shrinkage of the film.

31. In combination, a film support; means for laterally reciprocating the film step-by-step including a toothed member; and a cam having cam members engaging between the teeth of said member.

32. In combination, a film support; means for laterally reciprocating said support step-by-step including a reciprocatory toothed member and a movable member having a series of cam members engaging the teeth of said toothed member and providing diagonal cam passages, certain of said cam members being provided, adjacent to said passages with cam projections for engaging the teeth for causing them to pass into the passages.

33. In combination, a housing comprising a plurality of sections hinged to each other for movement for opening or closing the housing; a motion picture camera in said housing having a film feed mechanism in and entirely carried by one section and a shutter and shutter operating mechanism in the other section; said mechanisms being out of cooperating relation with each other when the housing is open and moved into cooperating relation when the housing is closed.

34. In combination, a reciprocatory support; feed and take-up spools on the support; means between said spools for feeding the film longitudinally; and yieldable pawl and ratchet means actuated by movement of the support for winding up the film on the take-up spool.

35. In combination, a support; a reciprocatory frame; a reciprocatory gripping member on the frame; a gripping bar opposed to said gripping member; means including tripping members for actuating said gripping bar; and means on said tripping members to engage said support to actuate said tripping members.

36. In combination, a frame; a reciprocatory gripping member on the frame provided with recesses; a gripping bar opposed to said gripping member; pins passing through said member and bar and having heads at both ends; spring washers on said pins compressed between said bar and the adjacent head; tripping members pivoted on said pins and provided with cam projections at times engageable in said V-recesses; and means to engage said arms to actuate said tripping members.

37. In combination, a fixed support having projections thereon; a laterally reciprocatory frame on said support; a reciprocatory gripping member on said frame provided with recesses; a gripping bar opposed to said gripping member; pins passing through said bar and member and having heads at both ends; spring washers on said pins between said bar and the adjacent head; tripping members pivoted on said pins respectively and provided with cam projections at times engageable in said recesses; and arms mounted on said tripping members and adapted to engage said projection of the support to actuate said tripping members.

38. In combination, a fixed support having fixed projections thereon; a laterally reciprocatory frame on said support, and means for feeding a film longitudinally on the frame; said means including a reciprocatory gripping member movable longitudinally of the film provided with end members having openings therethrough and V-shaped recesses radial to the openings; a gripping bar disposed along said gripping member opposed thereto for gripping the film against said member; pins passing through said openings and the ends of said bar and having heads at both ends; springs on said pins compressed between said bar and member; spring washers between said bar and the adjacent heads; tripping members each having a head pivoted on said pins respectively and provided with cam projections engageable in said V-shaped recesses when said gripping member and bar are separated and between said recesses when the film is gripped; and diverged arms mounted on said tripping members and adapted to engage and receive therebetween said fixed projection of the support as the frame reciprocates, thereby to actuate said tripping members.

39. In combination, a film support; an image directing means; means for causing relative movement between said film and directing means for directing successive images successively laterally across said film; and means for varying the amount of said movement for compensating for lateral shrinkage of the film.

40. In combination, a film support; an image directing means; means for causing relative movement between said film and directing means for directing successive images successively laterally across said film; means for varying the amount of said movement for compensating for lateral shrinkage of the film; means for causing relative longitudinal movement between said film and directing means for directing successive groups of images longitudinally of the film; and means for varying the amount of said longitudinal movement for compensating for longitudinal shrinkage of the film.

41. In combination, grippers for gripping a film; reciprocating means for reciprocating said grippers longitudinally of the film; actuating means independent of the reciprocating means for causing the grippers to grip and ungrip the film; and means for adjusting the distance of said movements.

42. In combination, means for laterally reciprocating a film step by step; reciprocatory grippers for longitudinally feeding the film; and means for adjusting the distance of the reciprocatory movement of said grippers for compensating for longitudinal shrinkage.

43. In combination, means for feeding a film laterally in successive sequences of lateral step by step movements and including moving parts engaging said film to effect the feeding; means for longitudinally feeding the film an increment after each of said sequences; and means for adjustably varying the distance of movement of said parts thereby to adjust the distance of said step by step movements.

44. In combination, means for feeding a film laterally in successive sequences of lateral step by step movements and including moving parts engaging said film to effect the feeding; means for longitudinally feeding the film an increment after each of said sequences; and means for adjustably varying the distance of movement of said parts thereby to adjust the distance of said increments.

CHARLES E. WHITEMAN.